United States Patent [19]
Morigaki et al.

[11] Patent Number: 5,597,659
[45] Date of Patent: Jan. 28, 1997

[54] MANUFACTURING METHOD OF A SEPARATOR FOR A LITHIUM SECONDARY BATTERY AND AN ORGANIC ELECTROLYTE LITHIUM SECONDARY BATTERY USING THE SAME SEPARATOR

[75] Inventors: Kenichi Morigaki, Nishinomiya; Noriko Kabuto, Moriguchi; Kazunori Haraguchi, Osaka, all of Japan

[73] Assignee: Matsushita Electric Industrial Co., Ltd., Osaka, Japan

[21] Appl. No.: 319,738

[22] Filed: Oct. 7, 1994

[30] Foreign Application Priority Data

Oct. 7, 1993 [JP] Japan ................. 5-277829
Dec. 7, 1993 [JP] Japan ................. 5-306383

[51] Int. Cl.$^6$ ................................. H07M 10/40
[52] U.S. Cl. ................. 429/190; 429/192; 429/253
[58] Field of Search ................. 429/190, 192, 429/253, 145

[56] References Cited

U.S. PATENT DOCUMENTS

| | | | |
|---|---|---|---|
| 4,748,542 | 5/1988 | Lundsgaard | 361/433 |
| 4,830,939 | 5/1989 | Lee et al. | 429/192 |
| 4,849,311 | 7/1989 | Itoh et al. | 429/192 |
| 4,925,752 | 5/1990 | Fauteux et al. | 429/191 |
| 5,001,023 | 3/1991 | Cheshire et al. | 429/192 X |
| 5,030,527 | 7/1991 | Carpio et al. | 429/192 |
| 5,166,008 | 11/1992 | Tomida et al. | 429/192 X |
| 5,223,353 | 6/1993 | Ohsawa et al. | 429/192 |
| 5,240,791 | 8/1993 | Izuti et al. | 429/192 |
| 5,281,491 | 1/1994 | Rein et al. | 429/62 |

FOREIGN PATENT DOCUMENTS

| | | |
|---|---|---|
| 1-319250 | 12/1989 | Japan . |
| 2-142063 | 5/1990 | Japan . |
| 2-162651 | 6/1990 | Japan . |
| 2-291673 | 12/1990 | Japan . |
| 3-129678 | 6/1991 | Japan . |
| 4-51473 | 2/1992 | Japan . |
| 4-36959 | 2/1992 | Japan . |
| 5-500880 | 2/1993 | Japan . |
| WO91/20105 | 12/1991 | WIPO . |

OTHER PUBLICATIONS

Kabata, T., Fujii, T., Kimura, O., and Ohsawa, T., "Gel–type Solid Polymer Electrolytes for Rechargeable Film Batteries" Polymers for Advanced Technologies vol. 4, pp. 205–208. 1993 Month N/A.

*Primary Examiner*—Stephen Kalafut
*Attorney, Agent, or Firm*—Ratner & Prestia

[57] ABSTRACT

An organic electrolyte lithium secondary battery wherein lithium is an active material. The battery comprises a negative electrode made of metallic lithium or a lithium alloy and a separator made of a microporous polyolefin separator matrix whose pores are filled with an ionic conductive gel electrolyte. The separator is in the form of a sheet with at least one face contacting the negative electrode having a gel electrolyte layer. The gel electrolyte is formed by ultraviolet irradiation of a solution having a major component being a mixture of an oligomer and a monomer added to an organic electrolyte. Using the separator in an organic electrolyte lithium secondary battery internal short circuiting of the battery due to dendridic lithium growing on a negative electrode during the charging cycle can be prevented and a longer cycle life achieved.

17 Claims, 2 Drawing Sheets

MANUFACTURING METHOD OF A SEPARATOR FOR A LITHIUM SECONDARY BATTERY AND AN ORGANIC ELECTROLYTE LITHIUM SECONDARY BATTERY USING THE SAME SEPARATOR

BACKGROUND OF THE INVENTION

1. Field of the Invention

The present invention relates generally to an organic electrolyte lithium secondary battery of which negative electrode consists of metallic lithium or lithium alloy and using lithium as an active material, and more particularly, to a separator of the same battery.

2. Description of the Prior Art

The lithium secondary battery of which negative electrode consists of metallic lithium or lithium alloy and using lithium as an active material and organic electrolyte draws attention to the point of a light-weight and compact power source, for the same battery has a higher energy density due to a higher voltage, and shows a better performance at low temperatures than general secondary batteries having an electrolyte of an aqueous solution.

However, active lithium deposited on a negative electrode in charging reacts to and decomposes an organic solvent of electrolyte, and deposited metallic lithium grows to dendrite and reacts to the organic solvent and then forms an insulating layer on the dendrited lithium surface, which results in forming poor-electronic-conductive lithium. R. Selim Bro, J. Electrochem. Soc, 121, 1457 (1974), etc. already reported this problem. This phenomena lowers the charge and discharge efficiency of a negative electrode composed of metallic lithium and lithium alloy and also reduces a battery capacity in the progress of charge and discharge cycles. Further, the dendrited metal lithium penetrates a separator to shortcircuit the battery inside, which shortens a cycle life. Due to these problems, the organic electrolyte lithium secondary battery of which negative electrode consists of metallic lithium or lithium alloy and using lithium as an active material is not yet practically used.

The occurrence of the dendrited lithium correlates with a charge current density, namely, the higher the current density is, the easier occurs dendrited lithium. In general, the lithium secondary batteries thus are devised to have a less charge current density: In order to enlarge the areas of each facing plate of negative and positive electrodes, the thin electrode plates are scrolled with a separator in between. The such electrode plate group and organic electrolyte have been studied to comprise the battery. However, since the plate surface is not smooth enough, a reaction occurs at some particular places, which forms dendrited lithium. The dendrited lithium thus formed on a negative electrode of lithium penetrates through a separator made of microporous membrane, and produces internal shortcircuit, which results in not only damaging battery performance as well as shortening a battery life, but also, in the worst case, generating heat to start burning.

In order to solve the problem of forming dendrited lithium, several intentions were already laid out, for example, Japanese Laid-Open No. Hei 3-129678 bulletin proposes that a wider positive electrode than that of a negative be used, and also, fringe part of a positive electrode be shielded with an insulating material having the same thickness of the positive electrode before facing to the counterpart of a negative electrode. The bulletin of Japanese Laid-Open No. Hei 4-51473 proposes that the fringe part of positive electrode be shielded with an electrically insulating material which is insoluble in electrolyte. Unfortunately, these inventions cannot show a practically satisfied result, for they have such problems as require a complicated manufacturing process, and have less capacity for active material being filled. In addition, an insufficient cohesive strength on the fringe part of positive electrode prevents from avoiding an internal shortcircuit due to the dropping of positive mixture. Further, Japanese Laid-Open No. Hei 1-319250 bulletin proposes that ion-permeable polymer such as polyacrylamid be coated to a separator in order to avoid penetration of fine particle of positive mixture into a separator. However, polyacrylamid is easy to solve in organic electrolyte, and forming a high density polymer-layer results in high internal resistance of the battery. These factors lower the battery performance. The bulletin of Japanese Laid-Open No. Hei 2-162651 proposes that the battery wherein electrode plate groups are wound have electrode plates on which solid polymer electrolyte film is formed. However solid polymer electrolyte film reacts to an active material of negative electrode to become deteriorated, and the same film has a problem in mechanical strength. The U.S. Pat. No. 5,281,491 proposes that multilayer porous sheet of different rheological properties be used as a separator. Yet, it requires complicated process to manufacture the batteries and accompanies a higher price of the separator.

Regarding the polymer electrolyte, the bulletin of Japanese Laid-Open No. Hei 2-291673 proposes that organic electrolyte be applied into it as a plasticizer to have it turned to gel electrolyte so that ion conductivity is dramatically improved.

In order to boost the mechanical strength of polymer electrolyte, it is laid open that polymer electrolyte and a separator are hybridized on the bulletins of Japanese Laid-Open No. Hei 4-36959 and 5-500880. However, when using polymer electrolyte, a positive electrode and negative electrode are not contacted with polymer electrolyte on the interface in between. This problem produces gaps on the interface particularly in charging or discharging because both of the electrode plates expand or shrink, which interferes with a smooth progress of efficient charge or discharge reaction.

The proposed ideas for improvement still have some problems as mentioned above. Indeed the internal shortcircuit due to the dendrited lithium can be avoided, but using an ion-conductive gel electrolyte independently proves that mechanical strength is poor, reliability is low and ionic conductivity remains insufficient at low temperatures. Since these factors lower the battery performances, the proposed ideas are not yet commercialized.

SUMMARY OF THE INVENTION

The present invention is to overcome those problems as mentioned above and is embodied in a lithium secondary battery wherein the following four items are shielded: a) a negative electrode consisting of metallic lithium or lithium alloys using lithium as an active material, b) a positive electrode consisting of metal oxide etc. as an active material, c) organic electrolyte, d) a separator using an ionic conductive material wherein a matrix is made of microporous membrane. The separator according to the present invention is made of an unified body of a microporous membrane and ionic conductive gel electrolyte, more specifically, the pores of the membrane are filled and closed with ionic conductive gel electrolyte, and at least one face contacting the negative electrode forms ionic conductive gel electrolyte layer. This structure of the separator according to the present invention prevents the dendrited lithium formed on the negative electrode from penetrating through the separator and producing internal shortcircuits of the battery, which assures to offer a reliable secondary battery free from danger.

DETAILED DESCRIPTION OF THE INVENTION

The present invention is detailed with embodiments by referring to drawings. First, a manufacturing method of a separator, a key point of the present invention, is explained.

EXAMPLE 1

A microporous polyethylene membrane of which porosity diameter is 0.27 μm, porosity is 60%, and thickness is 20–22 μm, commercially available as Celgard K878 made by Hoechest Celanese Corp., is used as a separator matrix. Organic electrolyte and ultraviolet curing resin are mixed at 80:20 weight ratio to form ionic conductive gel electrolyte. The details of each component is this:

The organic electrolyte consists of, for example, a mixed solvent of propylene carbonate and ethylene carbonate at volume ratio of 50:50 and lithium perchlorate $LiClO_4$ which is added as an electrolyte salt so that the organic electrolyte becomes 1 $mol/dm^3$ concentration.

The ultraviolet curing resin is made of a mixture wherein fat group polyether oligomer is mixed with monomer of which frame is polyethylene oxide whose both ends have acrylate group at a weight ratio of 50:50, and photo polymerization initiator 1.0 wt % is added therein.

The above polyethylene membrane is processed with polyethylene glycol alkyl ether of nonionic surface-active agent in order to gain enough lyophilic property, and then the above mixed solution is coated and impregnated to this membrane with a volume of 2.5 $\mu l/cm^2$. Next, ultraviolet ray is applied to the membrane to form ionic conductive gel electrolyte. When forming a thin ultraviolet curing resin, oxygen acts as a polymerization prohibitor, which causes problems. In addition, applying ultraviolet ray raises temperature to distort the membrane as well as close the pores.

Figure 1:
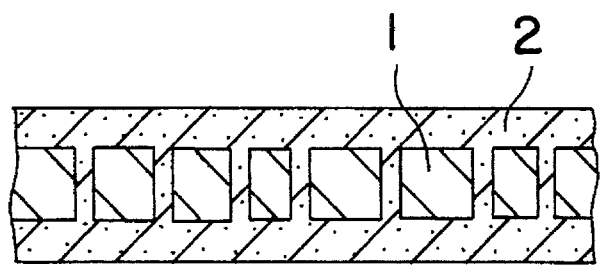
FIG. 1 is a typical cross-section view of a separator according to Example 1 of the present invention.

In order to overcome these problems, the membrane impregnated by the mixture is contacted by a glass board coated by fluoroplastics as a release agent so that influences of oxygen and temperature rise can be prevented. Then ultra violet ray is applied. As shown in FIG. 1, the micropores of the polyethylene microporous membrane 1 are filled with gel electrolyte, and also on the both faces of the membrane, the gel electrolyte layers 2 are formed. After these processes the separator of which thickness is 40 μm is produced, wherein microporous polyethylene membrane as a matrix is unified with ionic conductive gel electrolyte. This separator is called "a" hereinafter.

EXAMPLE 2

A microporous polyethylene membrane with 25 μm thickness and 38% porosity having 0.125 μm longer diameter and 0.05 μm shorter diameter, commercially available as Celgard 2400, is used as a separator matrix. This membrane is processed in a plasma irradiation equipment (Type Number EP4759 produced by Japan Vacuum Technology Co.,) under the condition of no more than 200 Pa vacuum value for five minutes in order to oxidize the separator for improving lyophilic property. With the same method as the separator "a" is produced, this separator material is unified with the ionic conductive gel electrolyte to produce a separator "b" of which thickness is 45 μm.

EXAMPLE 3

Figure 2:
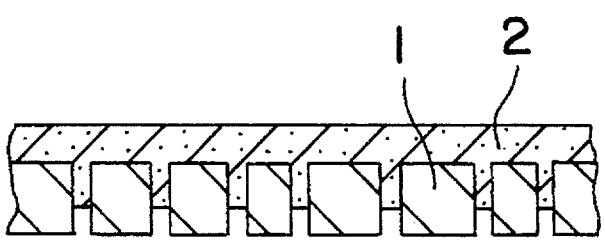
FIG. 2 is a typical cross-section view of a separator according to another example of the present invention.

A microporous polyethylene membrane with 25 μm of thickness, 0.3 μm of the maximum pore diameter and 38% of porosity rate, made by Tohnen Chemical Co., Ltd., is used as a separator matrix. Using the same method as the separator "b", this membrane is processed under the plasma application to oxidize the membrane surface for improving lyophilic property. As shown in FIG. 2, an ionic conductive gel electrolyte layer is provided on one side of the separator before applying ultra violet curing process to form a double layer of the separator material and the ionic conductive electrolyte. This separator "c" has a thickness of 30 μm.

In order to compare the separators "a", "b" and "c" according to the present invention with a conventional separator, the microporous polyethylene membrane (Celgard k878) used in the 1st embodiment is used to be a conventional separator "d".

Figure 3:
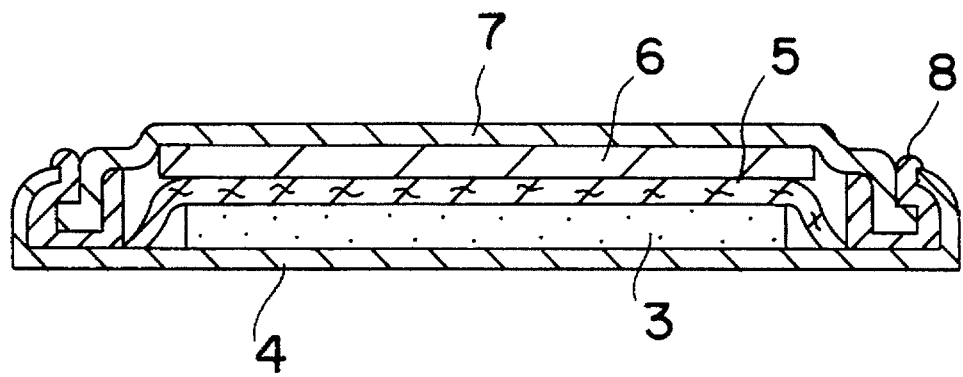
FIG. 3 is a typical cross-section view of a coin type organic electrolyte lithium secondary batter.

Next, as shown in FIG. 3, coin type organic electrolyte lithium secondary batteries "A", "B", "C" and "D" are made wherein the separators "a", "b", "b" and "d" are used. In FIG. 3, a positive electrode 3 is a disc of which diameter is made by this process:

Electrolytic manganese dioxide goes under heat treatment at 400° C. to turn into $MnO_2$ as a positive active material. This $MnO_2$, carbon black as a conductive material and polytetrafluoroethylene as a binder are mixed at a weight ratio of 90: 5: 5 to produce positive mixture. This positive mixture is molded into a disc having a diameter of 14.2 mm.

A stainless steel case is numbered 4, a separator is 5, metallic as a negative active material is 6, stainless cover is 7, a gasket of polypropylene is 8. Electrolyte is made of a mixed solvent of propylene carbonate and 1,2-dimethoxyethan at a volume ratio of 50:50 wherein lithium perchlorate is added so that a concentration of 1 $mol/dm^3$ is achieved. A specified amount of this electrolyte is applied to.

The batteries are tested under this condition:

The batteries are charged with 1.8 mA constant current upto 3.8 V, then discharged with 1.8 mA for 3 hours (5.4 mAh), and repeat this operation. When a discharging voltage reaches 2.0 V within 3 hours, discharge is stopped then.

Figure 4:
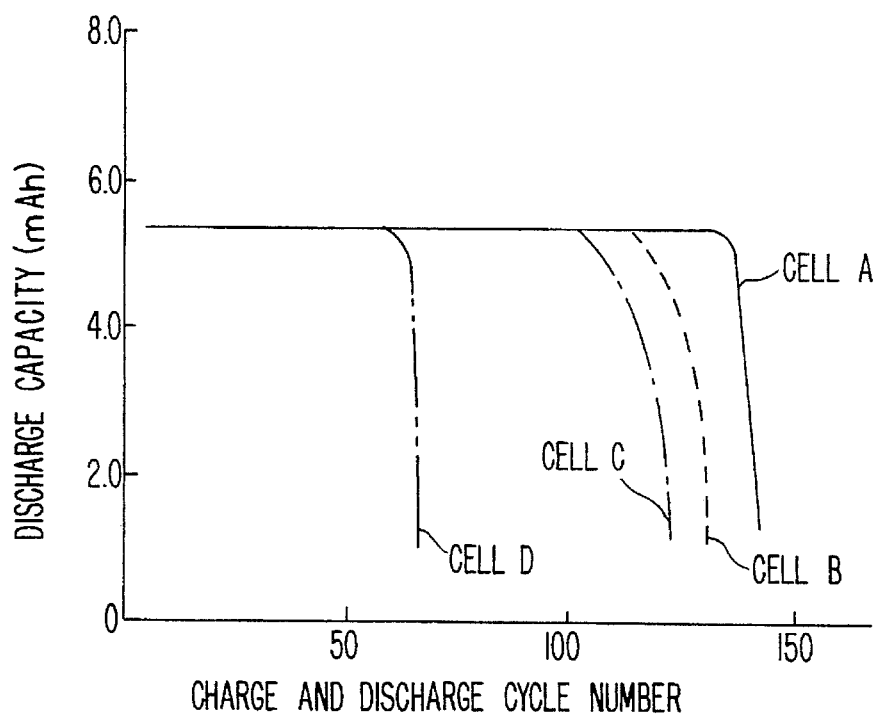
FIG. 4 is a charge-discharge cycle life characteristic curve of an organic electrolyte lithium secondary battery according to the present invention.

FIG. 4 shows the result of this charge and discharge test. The batteries "A", "B" and "C" according to the present invention show better performances than the conventional battery "D". The battery "A", among others, shows the highest number of charge and discharge cycles because of the separator "a" processed with a surface-active agent. The pores of the separator matrix are filled with ionic conductive gel electrolyte completely as well as evenly so that dendrited lithium formed on the negative electrode can be prevented from penetrating through the pores of the separator matrix into the positive electrode, which avoids weak intnar shortcircuits.

The batteries "B" and "C" show also great improvements in a characteristic of charge and discharge comparing with that of the conventional battery "D", for the separator matrix wherein lyophilic property is given by plasma application is filled completely by ionic conductive gel electrolyte into the pores, thus the shortening of battery cycle life due to internal shortcircuits is avoided as the battery "A" tells.

Figure 5:
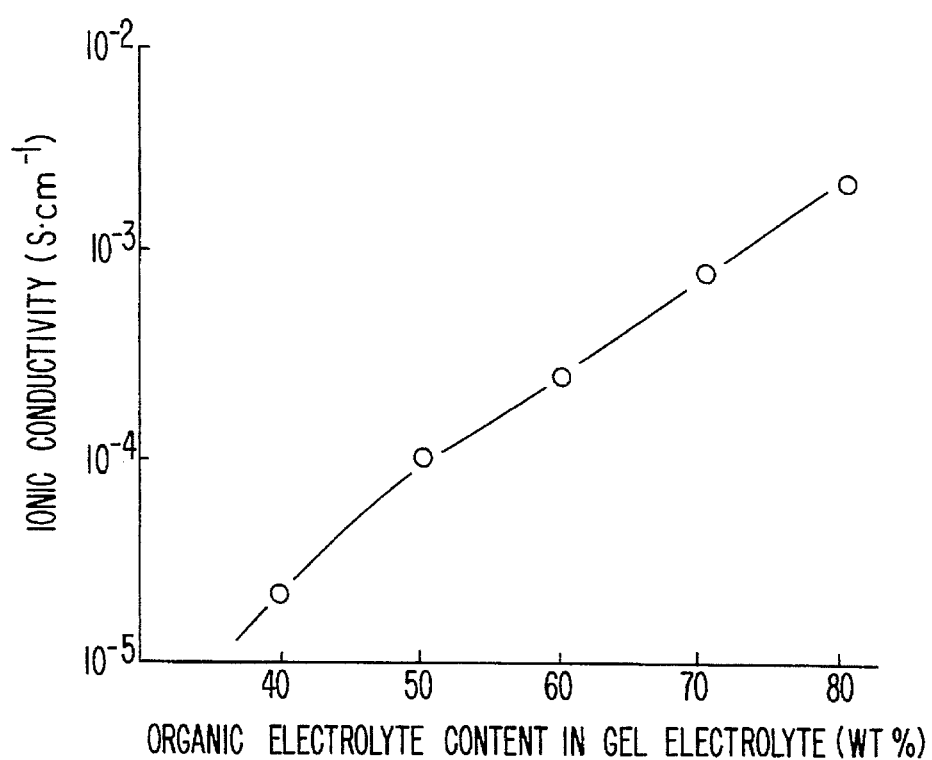
FIG. 5 is a curve showing a relation between content ratio of organic electrolyte in gel electrolyte and ionic conductivity.

FIG. 5 shows the ionic conductivity of the gel electrolyte measured at 25° C. wherein a weight ratio of organic electrolyte and ultra violet curing resin is changed. In this experiment, when organic electrolyte exceeds 85 wt %, proper gel electrolyte cannot be formed. FIG. 5 thus does not show a curve over 85 wt %. As FIG. 5 tells, the ionic conductivity of gel electrolyte depends on the content ratio of organic electrolyte. Since the lowering of the ratio sharply reduces the ionic conductivity, the content ratio of organic electrolyte hopefully maintains 50 wt % or more, and 80 wt % or less is preferable for the gel electrolyte having sufficient mechanical strength. The viscosity of the gel electrolyte also depends on the weight ratio of monomer and oligomer, both comprising the ultra violet curing resin.

The weight ratio can be adjusted without affecting the forming of the gel electrolyte layer. Further, adjusting a mixing ratio and a thickness of the gel electrolyte can vary an internal resistance of the battery, which makes is possible to change an internal resistance without changing the surface of electrode or cell structure. Therefore, a safety on the battery can be achieved even when a shortcircuit occurs outside.

A coin type battery is used in the above embodiment, however, a cylindrical battery can be also used, for the separator according to the present invention is so flexible and thin that fits to the structure of spiral electrode plate group formed by wound positive and negative electrodes with a separator in between.

The present invention is not limited to the above embodiments and various other modifications are possible.

For example, as an electrolyte salt, $LiAsF_6$, $LiCF_3SO_3$, $LiN(CF_3SO_2)_2$ and so on can be used.

As an organic solvent, γ-butyrolactome(γ-BL), γ-valerolactone(γ-VL), dimethylsulfoxide(DMSO), 2-methyltetrahydofuran(2Me-THF), 1,4-dioxane, dimethoxyethane(DME), diethoxyethane(DEE), ethylacetate(EA), ethylpropionate(EP), diethylcarbonate(DEC) and so on can be used.

As an positive electrode, $LiCoO_2$, $LiNiO_2$, $LiMn_2O_4$, $LiV_3O_8$, $V_2O_5$, $V_6O_{13}$ and so on can be used.

As explained above, using the separator according to the present invention proves that the dendrited lithium which is deposited on the negative electrode during charging is prevented from penetrating through the separator so that internal shortcircuits can be avoided. Further, adjusting the composition of gel electrolyte and thickness can control internal resistance, which can reduce danger when outside shortcircuits occur.

The present invention thus offers a lithium secondary battery having high reliability and safety as well as having a scarce chance for an internal shortcircuit to occur.

What is claimed is:

1. An organic electrolyte lithium secondary battery comprising:

an electrode group comprising a negative electrode formed of material selected from the group consisting of metallic lithium and lithium alloys, a positive electrode and a separator in between said negative and positive electrodes, wherein said separator comprises a separator matrix formed of a microporous polyolefin membrane impregnated with an ionic conductive gel electrolyte.

2. An organic electrolyte lithium secondary battery comprising:

an electrode group comprising a negative electrode formed of material selected from the group consisting of metallic lithium and lithium alloys, a positive electrode and a separator in between said negative and positive electrodes, wherein said separator comprises a separator matrix formed of a microporous polyolefin membrane impregnated with an ionic conductive gel electrolyte, and said separator matrix has a sheet having at least one face containing said gel electrolyte layer contacting said negative electrode.

3. An organic electrolyte lithium secondary battery according to claim 1, wherein said separator comprises:

microporous polyolefin membrane and ionic conductive electrolyte gel containing an organic electrolyte and a resin cured by ultraviolet light.

4. An organic electrolyte lithium secondary battery according to claim 2, wherein said separator comprises:

microporous polyolefin membrane and ionic conductive gel electrolyte containing an organic electrolyte and a resin cured by ultraviolet light.

5. An organic electrolyte lithium secondary battery according to claim 1, 2, 3, or 4 wherein said separator comprises:

microporous polyolefin membrane and ionic conductive gel electrolyte containing 20–80 wt % of an organic electrolyte and a 20–50 wt % of a resin cured by ultraviolet light.

6. An organic electrolyte lithium secondary battery according to claim 1, 2, 3, or 4 wherein said separator comprises:

a microporous polyolefin membrane and an ionic conductive gel electrolyte comprising an organic electrolyte of a lithium salt.

7. An organic electrolyte lithium secondary battery according to claim 5, wherein said separator comprises:

a microporous polyolefin membrane and an ionic conductive gel electrolyte comprising an organic electrolyte of a lithium salt.

8. An organic electrolyte lithium battery according to claim 1, wherein said ionic conductive gel electrolyte contains an organic electrolyte and a resin cured by ultraviolet light.

9. An organic electrolyte lithium battery according to claim 2, wherein said ionic conductive gel electrolyte contains an organic electrolyte and a resin cured by ultraviolet light.

10. An organic electrolyte lithium battery according to claim 8, wherein said organic electrolyte is formed by reacting a mixed solvent of a propylene carbonate and an ethylene carbonate, and lithium perchlorate.

11. An organic electrolyte lithium battery according to claim 8, wherein said resin is formed from a precursor which is the reaction product of a polyether oligomer, a monomer of polyethylene oxide, and a photo polymerization initiator.

12. An organic electrolyte lithium battery according to claim 9, wherein said organic electrolyte is formed by reacting a mixed solvent of a propylene carbonate and an ethylene carbonate, and lithium perchlorate.

13. An organic electrolyte lithium battery according to claim 9, wherein said resin is formed from a precursor which is the reaction product of a polyether oligomer, a monomer of polyethylene oxide, and a photo polymerization initiator.

14. An organic electrolyte lithium secondary battery according to claim 1, wherein said microporous polyolefin membrane comprises micropores entirely filled with said ionic conductive gel electrolyte.

15. An organic electrolyte lithium battery according to claim 2, wherein said microporous polyolefin membrane comprises micropores entirely filled with said ionic conductive gel electrolyte.

16. An organic electrolyte lithium battery according to claim 14, wherein said microporous membrane of said separator has top and bottom faces, each of said faces further comprising an ionic conductive gel electrolyte layer formed thereon.

17. An organic electrolyte lithium battery according to claim 15, wherein said microporous membrane of said separator has top and bottom faces, each of said faces further comprising an ionic conductive gel electrolyte layer formed thereon.

* * * * *